United States Patent Office 2,997,462
Patented Aug. 22, 1961

2,997,462
SURFACE ACTIVE POLYESTERS
Carl Wulff, Dusseldorf-Benrath, Manfred Dohr, Dusseldorf-Wersten, and Horst-Jürgen Krause, Dusseldorf-Benrath, Germany, assignors to Henkel & Cie. G.m.b.H., Dusseldorf-Holthausen, Germany, a German corporation
No Drawing. Filed Feb. 12, 1957, Ser. No. 639,636
Claims priority, application Germany Mar. 12, 1956
4 Claims. (Cl. 260—75)

This invention relates to novel surface active polyesters.

Surface active agents generally contain hydrophilic and hydrophobic groups and are used in aqueous solutions as detergents and for other purposes where a wetting action or reduction of surface tension is desired. The surface active materials form micelles, i.e., aggregates composed of a number of molecules held loosely together by secondary forces which are weaker than the primary valence bonds of the molecules, in aqueous solutions and this formation of the micelles is considered as a prerequisite for use of the surface active agents as detergents. The tendency toward micelle formation differs widely with the various surface active agents and is dependent upon the concentration of the surface active agents in solution or on the presence of other components in the solution as well as on the temperature and other variables. In order to make the formation of the micelles independent of these variables, it has been proposed to anticipate the micelle formation upon the synthesis of the surface active agents and for this purpose to bind together by the main valence bonds, molecules which consist, in accordance with the general structural principal of surface active agents, of a hydrophobic molecular portion and a hydrophilic molecular portion. Such preparation includes, for example, polyesters of dicarboxylic acids having 6 to 13 carbon atoms, with polyglycols. These polyesters, however, did not prove completely satisfactory as detergents and did not fulfill expectations based on the micelle formation.

One object of this invention are novel surface active polyesters whose activity in aqueous solutions is, to a large extent, independent upon subsequent micelle formation. This, and still further objects will become apparent in the following description:

The novel surface active agents, in accordance with the invention, are water soluble polyesters of a polyglycol and a dicarboxylic acid having, joining the carboxylic acid groups, a water insoluble divalent hydrocarbon radical containing 15 to 20 carbon atoms and preferably 18 to 35 carbon atoms with at least one in termediate carbonamide group.

The polyglycol esterification component is selected with respect to the molecular size of the dicarboxylic acid so that the final esterification product is water soluble.

The novel polyesters, in accordance with the invention, are obtained by conventional esterification of the dicarboxylic acid with the polyglycol.

The starting dicarboxylic acid used in accordance with the invention may have the structure:

(I) HOOC—R—(COHN—R—NHOC—R—)$_n$COOH, or
(II) HOOC—R—NHOC—R—COHN—R—COOH, or
(III) HOOC—R—(NHOC—R—)$_n$COOH, or
(IV) Amidation product of 1 mol of a dicarboxylic acid in accordance with Equation I and 1 or 2 mols of an aminocarboxylic acid in which each of the R's may represent a different or the same hydrocarbon radical, at least one of the R's containing at least 4 and preferably 6 to 18 carbon atoms with the total of all of the R's in the molecule along with the carbonamide group or groups forming the water insoluble divalent hydrocarbon radical containing the 15 to 50 and preferably 18 to 35 carbon atoms. In the formula, $n$ represents a whole number of at least 1. The upper limit which $n$ may represent is determined by the value of the R's in the formula so that the total carbon number in the radical represented by the R's and the carbonamide group or groups does not substantially exceed 50.

Dicarboxylic acids of type I above, may be obtained, for example, by reacting $n+1$ mols of a dicarboxylic acid with $n$ mols of a diamide. Dicarboxylic acids of the type II set forth above are obtained, for example, by reacting an aminocarboxylic acid with a dicarboxylic acid in the molar ratio of 2:1. Dicarboxylic acids of the type III mentioned above may be obtained, for example, by reacting aminocarboxylic acid and a dicarboxylic acid in a molar ratio of $n$ mol of the aminocarboxylic acids per mol of the dicarboxylic acid.

The dicarboxylic acids, diamines and aminocarboxylic acids may contain 2, and preferably 2 to 20 carbon atoms in the molecule, but at least one of the radicals represented by R in the formula should contain at least 4 and preferably 6 to 18 carbon atoms.

As the alcoholic esterification components, it is preferable to use water-soluble polyethyleneglycols in which the number of glycol ether radicals present in the molecule may be at least 5 and preferably 10 to 100.

The carboxylic acid radicals from which the novel esters, in accordance with the invention, are constructed, may be aliphatic, cycloaliphatic or aromatic in nature or any combination thereof. Of particular importance are straight chain $\alpha,\omega$ dicarboxylic acid or $\alpha,\omega$ aminocarboxylic acids. Branched chain carboxylic acids may also be used, as for example, dicarboxylic acids which are obtained, for example, by the catalytic addition of carbon monoxide and hydrogen (oxo synthesis) to diolefines, unsaturated fatty alcohols or unsaturated fatty acids and by the oxidation of the aldehyde or methylol groups formed upon this addition. These carboxylic acids may also be obtained by reacting the above mentioned unsaturated starting materials with carbon monoxide and water.

For the esterification, the alcoholic and acid esterification components which are to be reacted with each other are so selected that water-soluble esters are formed. Depending on the size of the water insoluble radicals present in the dicarboxylic acid component, there must be selected an alcoholic esterification component having a larger or smaller number of polyether oxygen atoms in order that sufficient water-solubility of the esterification product is assured. If, for example, a dicarboxylic acid is used which contains 15 to 50 carbon atoms, there should then be selected a polyether component containing about 10 to 100 ether oxygen atoms in the molecule. As alcoholic and acid esterification components, which are to be reacted with each other, there may be used a polyethylene glycol of a molecular weight of about 4000 and hexamethylene dicarbonamide adipic acid or a polyethylene glycol having an average molecular weight of about 12,000 and hexamethylene dicarbonamide brassylic acid.

The molecular weight of the esters, in accordance with the invention, may be regulated, to a large extent, by the molar ratio of the esterification components employed. The closer the molar ratio of the two esterification components is to the value 1:1, the greater the possibility for the formation of high molecular esterification components. In practice it is, however, not always necessary to use this value and in most cases it is sufficient that the molar ratio of the two esterification components be in the values of 10:5 and 5:10. Between these values, any intermediates may be chosen, e.g. 10:6, 10:7, 10:8, 10:9, 9:10, 8:10, 7:10, 6:10 or others.

The esterification, in accordance with the invention, is effected in the conventional manner with the acid and alcoholic esterification components being heated in the presence of entraining agents, i.e., water-insoluble organic solvents with boiling points of preferably 80–150° C. and the water of reaction is removed from the reaction mixture. The quantity of water removed and the increasing viscosity of the solution may be used as a measure of the course of the reaction. It is also possible to effect the esterification with the acid esterification components employed in the form of acid chlorides and by effecting the reaction in the presence of acid-binding materials. This procedure may, for example, be effected in the manner described in the United States Patents 2,562,878 and 2,567,076. For the preparation of the starting dicarboxylic acid, an amine is reacted with the corresponding carboxylic acid chloride or carboxylic acid ester or the carboxylic acid and the amine is heated until the splitting up of water occurs. When diamines and dicarboxylic acids are employed, the quantity ratio may vary within certain limits so that the desired molecular weights are obtained.

It is also possible to prepare salts from the diamines and dicarboxylic acids and to effect the conversion of salts into the corresponding amides simultaneously with the esterification.

The products obtained in accordance with the invention can be used as detergents or detergent components in textile processing and in commercial and household laundries. The ester groups contained in the polyesters are sufficiently stable towards wash alkalis at the temperatures which enter into question to be used in the customary alkaline washing and cleaning agents even at boiling temperatures. Accordingly, with the use of the polyesters employed in accordance with the invention, both fine detergents and boiling detergents can be formed, particularly if the alkalinity of the boiling detergents is not greater than that of soda.

The surface active agents prepared in accordance with the invention can be combined with the customary components of boiling or fine detergents. This includes surface-active substances, salts of neutral or alkaline reaction, per compounds, water-soluble high-molecular substances, dyestuffs as well as other conventional detergent additives.

As surface-active substances which can be used together with those prepared in accordance with the invention, there can be employed anion-active and cation-active products as well as non-ionic products or any desired combinations thereof. Examples of anion-active substances, include soaps, the large number of synthetic anion-active wash-active substances such as paraffin sulfonates, alkylaryl sulfonates or other compounds of the sulfonate type, fatty alcohol sulfates, fatty acid mono-glyceride sulfates or other compounds of the sulfate type and derivatives of amino acids or protein hydrolyzates which contain higher non-polar radicals in the molecule. To the various cation-active compounds, there belong quaternary ammonium salts derived for instance from fatty amines. The quaternary nitrogen atom may be part of a heterocyclic ring system. As non-ionic substances, there enter into consideration, in particular, the polyethers, particularly the polyglycolethers of fatty alcohols or alkylphenols or the polyglycolesters of fatty acids.

In order to increase the washing action of the detergents the same can contain auxiliary substances of an organic or inorganic nature such as carbonic acid, alkylol amides, water-soluble, high-molecular substances such as glue, gelatines, celluloseglycolates, cellulosesulfates, celluloseoxalkylsulfonates as well as the corresponding derivatives of starch and furthermore alginates or pectinates and other salts of polyuronic acids.

Detergents which contain the surface-active polyesters prepared in accordance with the invention may contain inorganic or organic salts of a neutral to alkaline reaction. As washing alkalis, there can be used the substances customarily employed for this purpose, for instance sodium carbonate, sodium bicarbonate, di or trisodium-phosphate, etc. The detergents in accordance with the invention can also contain the anhydrous phosphates, i.e. water-soluble salts of acids of phosphorus which can be produced by the splitting off of water from orthophosphoric acid frequently added in the known manner to washing agents. Of particular importance are anhydrous phosphates of neutral to alkaline reaction such as the pyrophosphate or the tripolyphosphate of the formula $Na_5P_3O_{10}$ or the tetrapolyphosphate of the formula $Na_6P_4O_{13}$. Anhydrous phosphates of acid reaction such as metaphosphates which are present generally in the form of polymers, such as hexametaphosphate, should be present in the detergents in accordance with the invention only in such quantities that the alkaline reaction of other washing-components is compensated. The salts of inorganic cations can be replaced in whole or in part by the salts of organic cations, particularly of guanadine bases. Instead of the complex-forming phosphates, there may also be used other complex formers such as nitrilotri-acetic acid or ethylene diamineotetracetic acid, as well as other aminopolycarboxylic acids which contain more carboxyl groups than nitrogen.

Inorganic or organic per compounds which may be present in the detergents of the invention are for instance per phosphates, percarbonates and perborates. To the inorganic per compounds within the meaning of this invention, there also belong the solid urea addition compounds of hydrogen peroxide since the HOO radical is not organically bound in these solid compounds in contradistinction to the organic hydroperoxides. Organic per compounds are compounds which contain the —C—OOH or —C—O—O—C— groups at least once in the molecule. The free bonds of the carbon atoms can be saturated in any desired manner. Examples of such compounds are the hydroperoxides of hydrocarbons, for instance of cumene, or the hydroperoxides of carboxylic acids. The amount of per compounds in bleaching washing agents in accordance with the invention corresponds to a content of active oxygen of up to 3.5% by weight and preferably 0.2–3% by weight. The per compounds are preferably used together with stabilizers. As such, there may be employed water-insoluble oxides, hydroxides, silicates, phosphates and soaps of the alkaline earths, particularly of magnesium and the corresponding compounds of tin and aluminum; however, other compounds may also be employed such as metastannic acid, etc.

Other auxiliary substances are for instance coloring materials or substances which although colorless themselves fluoresce blue under the action of ultraviolet rays, particularly if they dye substantively on the fibers. These substances are known by the name "optical bleaching agents" or "brighteners." They also include water-soluble derivatives of aminostilbenes.

The following examples are given by way of illustration and not limitation.

EXAMPLE 1

*(a) Preparation of a condensation product consisting of 2 equivalents of adipic acid ethylester chloride and 1 equivalent of hexamethylene diamine*

In a three neck flask provided with agitator, reflux condenser with calcium chloride tube and dropping funnel, there were dissolved 53 parts by weight of hexamethylene diamine (0.457 mol) in 300 parts by weight of benzene, whereupon a solution of 115.2 parts by weight of adipic acid ethyl ester chloride (0.608 mol) in 150 parts by weight of benzene, were added drop by drop while stirring at 40–50° C. The reaction product obtained after the benzene had been distilled off was recrystallized from a 1:1 mixture of ethyl alcohol and carbon tetrachloride. The melting point of the product was 117° C.

(b) *Polyesterification of the condensation product prepared in accordance with (a)*

In a three-neck flask provided with agitator, Claisen attachment, ordinary condenser and capillary, a mixture of 10.71 parts by weight of the condensation product (0.025 mol) with 100.0 parts by weight of a polyethylene glycol of a molecular weight of 4,000 (0.025 mol) was heated for three hours in a nitrogen stream while stirring under the vacuum of a water jet pump, at 180° C. after the addition of 0.1 part by weight of zinc oxide. Thereupon, the condensation was terminated by heating for 12 hours at 240° C. under a vacuum of 0.1 mm. Hg. The reaction product obtained was a hard, brittle, water-soluble resin which could easily be formed into a powder. This product may also be designated as the polyester of polyethylene glycol of a molecular weight of about 4,000 having at least 5 ether oxygen atoms and hexamethylene dicarbonamide bis-valeric acid, as well as the corresponding hexamethylene dicarbonamide adipic acid polyester. The melting point of the product was 49° C.

EXAMPLE 2

(a) *Preparation of an acid salt from hexamethylene diamine and brassylic acid*

In the apparatus described in Exmple 1, 2.09 parts by weight of hexamethylenediamine (0.025 mol) were dissolved in 10 parts by weight of boiling methyl alcohol and a solution of 12.22 parts by weight brassylic acid (0.05 mol) was added drop by drop to 40 parts by weight of methyl alcohol. The reaction product which precipitated out upon cooling was recrystallized after the removal of the methyl alcohol by suction filtering, with the addition of activated carbon.

(b) *Simultaneous amidation of the acid salt prepared in accordance with (a) and polyesterification of the dicarboxylic acid obtained in this manner*

In the apparatus described in Example 1, a mixture of 5.04 parts by weight of the hexamethylenediammonium-dibrassylate (0.0083 mol), 100 parts by weight of a polyethylene glycol of a medium molecular weight of 12000 (0.0083 mol) and 15 parts by weight of water were heated while passing through a weak stream of nitrogen, first of all at atmospheric pressure for 2 hours at 150° C. and then for 8 hours at 200° C. and then for 5 hours at 12 mm. Hg at 250° C. and 18 hours at 0.5 mm. Hg at 250° C. After cooling, there was obtained a water-soluble brittle resin which could be readily pulverized. This product may also be designated as the polyester of polyethylene glycol of a molecular weight of about 12,000 having at least 5 ether oxygen atoms and hexamethylene dicarbonamide bis-lauric acid, as well as the corresponding hexamethylene dicarbonamide brassylic acid polyester. The melting point of the product was 64° C.

EXAMPLE 3

A washing agent with a content of the capillary active substance according to this invention may have the following composition 25% by weight polyester-polyamide according to Example 1 or 2
30% by weight $Na_5P_3O_{10}$
15% by weight $Na_4P_2O_7$
6% by weight $Na_2O \cdot 3.3SiO_2$
15% by weight $Na_2SO_4$
0.2% by weight carboxylmethylcellulose
0.1% by weight brightener
Balance water When using a 0.3–2% aqueous solution of this washing agent in commercial washing machines, a good cleaning action is observed with a low development of foam.

EXAMPLE 4

Instead of the washing agent according to Example 3, the following one may be used:

20% by weight polyester-polyamide according to Example 1 or 2
5% by weight alkyl benzene sulfonate (alkyl=$C_{12}$)
10% by weight $Na_4P_2O_7$
25% by weight $Na_5P_3O_{10}$
6% by weight $Na_2O \cdot 3.3SiO_2$
25% by weight $Na_2SO_4$
0.2% by weight carboxy methylcellulose
0.1% by weight brightener
Balance water

We claim:
1. Ester selected from the group consisting of the ester of polyethylene glycol of a molecular weight of about 4,000 having at least 5 ether oxygen atoms and hexamethylene dicarbonamide bis-valeric acid and the ester of polyethylene glycol of a molecular weight of about 12,000 having at least 5 ether oxygen atoms and hexamethylene dicarbonamide bis-lauric acid.

2. A detergent composition containing the ester selected from the group consisting of an ester of polyethylene glycol of a molecular weight of about 4,000 having at least 5 ether oxygen atoms and hexamethylene dicarbonamide bis-valeric acid and the ester of polyethylene glycol of a molecular weight of about 12,000 having at least 5 ether oxygen atoms and hexamethylene dicarbonamide bis-lauric acid.

3. A water-soluble surface active resinous polyester selected from the group consisting of a polyester of polyethylene glycol of a molecular weight of about 4,000 having at least 5 ether oxygen atoms with the condensation product of hexamethylene dicarbonamide bis-valeric acid and a polyester of polyethylene glycol of a molecular weight of about 12,000 having at least 5 ether oxygen atoms with the condensation product of hexamethylene dicarbonamide bis-lauric acid.

4. A detergent composition containing a water-soluble surface active resinous polyester selected from the group consisting of a polyester of polyethylene glycol of a molecular weight of about 4,000 having at least 5 ether oxygen atoms with the condensation product of hexamethylene dicarbonamide bis-valeric acid and a polyester of polyethylene glycol of a molecular weight of about 12,000 having at least 5 ether oxygen atoms with the condensation product of hexamethylene dicarbonamide bis-lauric acid.

References Cited in the file of this patent

UNITED STATES PATENTS

| | | |
|---|---|---|
| 2,475,034 | Lasher | July 5, 1949 |
| 2,559,583 | Barker | July 10, 1951 |

FOREIGN PATENTS

| | | |
|---|---|---|
| 889,344 | France | Sept. 27, 1943 |